United States Patent [19]

Coleman et al.

[11] Patent Number: 4,955,197
[45] Date of Patent: Sep. 11, 1990

[54] MASTER CYLINDER ATTACHMENT ADAPTER

[75] Inventors: John R. Coleman, Dayton; Malvin L. Schubert, Kettering, both of Ohio

[73] Assignee: General Motors Corporation, Detroit, Mich.

[21] Appl. No.: 405,502

[22] Filed: Sep. 11, 1989

[51] Int. Cl.$^5$ .............................................. B60T 13/00
[52] U.S. Cl. ...................................... 60/547.1; 60/593
[58] Field of Search .................. 60/533, 547.1, 547.2, 60/547.3, 593; 92/128

[56] References Cited

U.S. PATENT DOCUMENTS

| | | | |
|---|---|---|---|
| 3,145,625 | 8/1964 | Randol | 60/547.1 |
| 4,725,029 | 2/1988 | Herve | 248/223.1 |
| 4,784,046 | 11/1988 | Gautier | 92/128 |

Primary Examiner—Allen M. Ostrager
Attorney, Agent, or Firm—E. E. Helms

[57] ABSTRACT

An apparatus is provided for connecting a master cylinder to a brake booster of the type which has a shell with a planar front surface and a plurality of threaded studs displayed about the bore and projecting from the planar front surface. The master cyliner has a necked down end portion defining a shoulder facing the booster. The master cylinder has a circumferential extending groove provided in the necked down end portion and spaced longitudinally from the shoulder. An adapter has a central aperture to receive the necked down end portion of the master cylinder and a plurality of apertures which register with the plurality of threaded studs. A lock ring or other locking device is received in the groove of the master cylinder and effective to lock the adapter to the master cylinder and in engagement with the shoulder. A plurality of threaded nuts are installed on the threaded studs to retain the adapter in engagement with the planar surface of the booster shell.

7 Claims, 3 Drawing Sheets

MASTER CYLINDER ATTACHMENT ADAPTER

The invention relates to attaching a master cylinder to a booster and more particularly an adapter for attaching a standardized master cylinder to various style boosters.

BACKGROUND OF THE INVENTION

Vehicle brake systems for motor vehicles include a master cylinder which is attached to a brake booster. The brake booster is actuated by a brake pedal and has a plunger which extends into the master cylinder to actuate the master cylinder.

The master cylinder conventionally has a cast housing with a flanged end having holes for receiving studs which project from the front surface of the brake booster shell. Thus, in order to attach a master cylinder to a brake booster, the holes of the master cylinder casting must be of the same number, spacing and diameter as the studs projecting from the brake booster shell.

It would be desirable to be able to attach a master cylinder to a brake booster regardless of the number, spacing and diameter of the studs projecting from the brake booster so that vehicle manufactures and service garages would not have to inventory a large number of different master cylinders having different hole numbers, spacings and sizes.

SUMMARY OF THE INVENTION

The invention provides an apparatus for connecting a master cylinder to a brake booster of the type which has a shell with a planar front surface and a plurality of threaded studs displayed about the bore and projecting from the planar front surface. The master cylinder has a necked down end portion defining a shoulder facing the booster. The master cylinder has a circumferential extending groove provided in the necked down end portion and spaced longitudinally from the shoulder. An adapter has a central aperture to receive the necked down end portion of the master cylinder and a plurality of apertures which register with the plurality of threaded studs. A lock ring or other locking device is received in the groove of the master cylinder and is effective to lock the adapter to the master cylinder and in engagement with the shoulder. A plurality of threaded nuts are installed on the threaded studs to retain the adapter in engagement with the planar surface of the booster shell.

Alternatively the master cylinder body has a connection end with a flange providing a plurality of tabs. There is a plurality of braces with each brace adapted to fit in overlying engagement with one of the tabs and having a hole for receiving one of the threaded studs. A plurality of threaded nuts are installed on the threaded studs so that the braces retain the tabs in engagement with the planar surface of the booster shell.

One object, feature and advantage of the invention is to provide an improved means for attaching the master cylinder to the booster.

It is an object of the present invention to standardize the connection means of master cylinder.

It is an object of the present invention to eliminate the requirement of different setups and machinings of master cylinder.

It is an object of the present invention to reduce the need for inventory of multiple style master cylinders.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
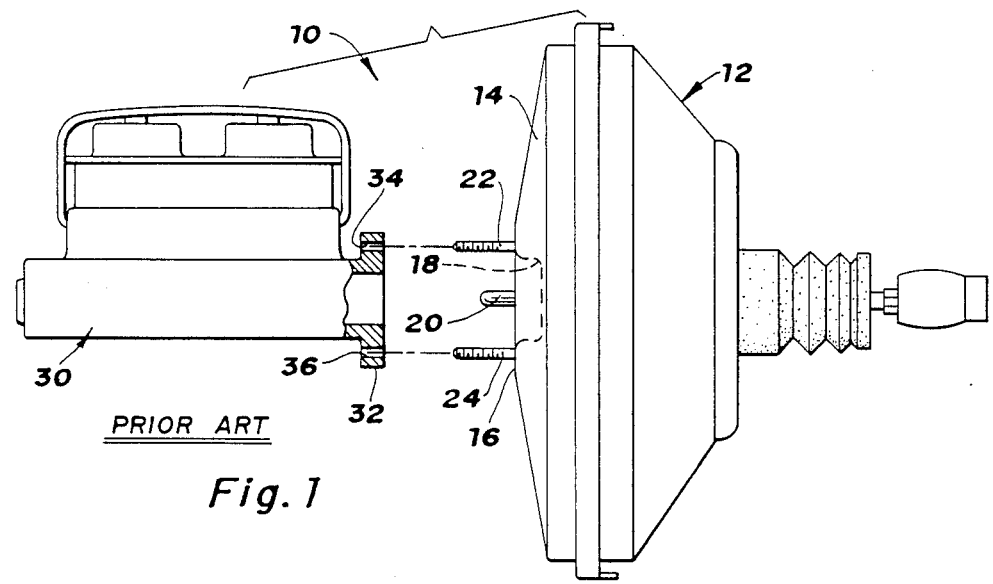
FIG. 1 is a side view of a prior art brake booster and master cylinder.

The prior art master cylinder and servo booster assembly 10 has a servo booster 12 which has a front shell 14 as shown in FIG. 1. The front shell 14 has a planar front surface 16 and a bore 18 with a pushrod 20 projecting from the bore 18. The front shell 14 has threaded studs 22 and 24 projecting from the planar front surface 16 for connecting the servo booster 12 to a master cylinder 30. The master cylinder 30 has a cast flange 32 with a pair of holes 34 and 36. The holes 34 and 36 are spaced and aligned to accept the threaded studs 22 and 24. The master cylinder 30 had to be designed to specifically fit a certain servo booster 12 so that the holes 34 and 36 align with the threaded studs 22 and 24.

Figure 2:
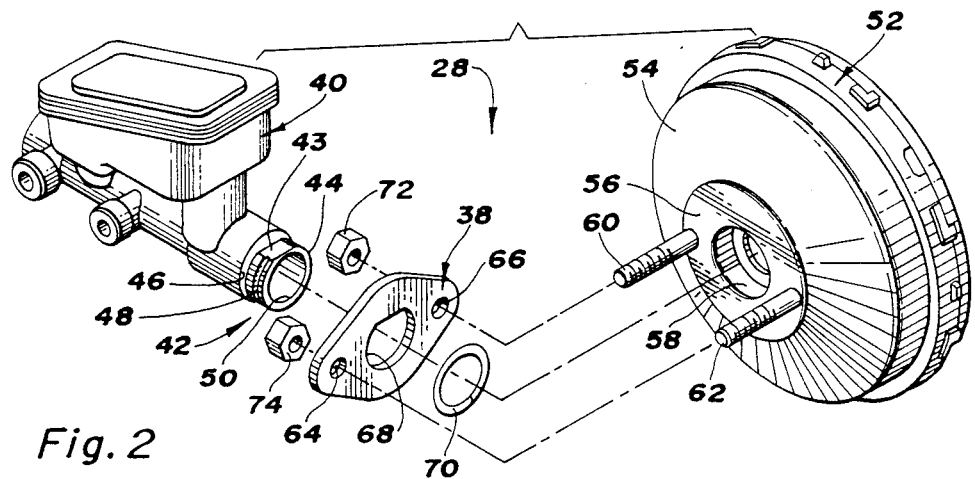
FIG. 2 is an exploded perspective view of a first embodiment of the invention.

The master cylinder and servo booster assembly 28 of the present invention as shown in FIG. 2, contains an adapter flange 38 which allows a master cylinder 40 to have a standardized end portion 42 but connects to a variety of servo booster 52. The end portion 42 of the master cylinder 40 has a necked down segment 44 which defines a shoulder 46 facing the booster 52. The necked down segment 44 has a flat surface or portion 43 giving the end portion 42 a "D" shaped cross section. A circumferential extending groove 48 is located on the necked down segment 44 a defined distance from the shoulder 46. The end portion has a bore 50 which receives a pushrod, not shown, from the servo booster 52.

The servo booster 52 has a front shell 54 with a planar front surface 56 and a bore 58. The bore 58 has a pushrod, not shown, projecting from it. The front shell 54 has two threaded studs 60 and 62 for connecting the servo booster 52 to the flange 38. The flange 38 has two holes 64 and 66 that are aligned and spaced to register with the threaded studs 60 and 62.

The flange 38 has an aperture 68 for fitting the necked down segment 44 of the master cylinder 40. A lock ring 70 is received in the groove 48 on the master cylinder 40. The lock ring 70 holds the flange 38 against the shoulder 46 of the master cylinder 40. The aperture 68 is a "D" shape which engages with flat surface 43 of the necked down segment 44 to prevent rotation between the master cylinder 40 and the flange 38.

Two threaded nuts 72 and 74 are installed on the threaded studs 60 and 62 to hold the flange 38 against the planar front surface 56 of the servo booster 52.

Figure 3:
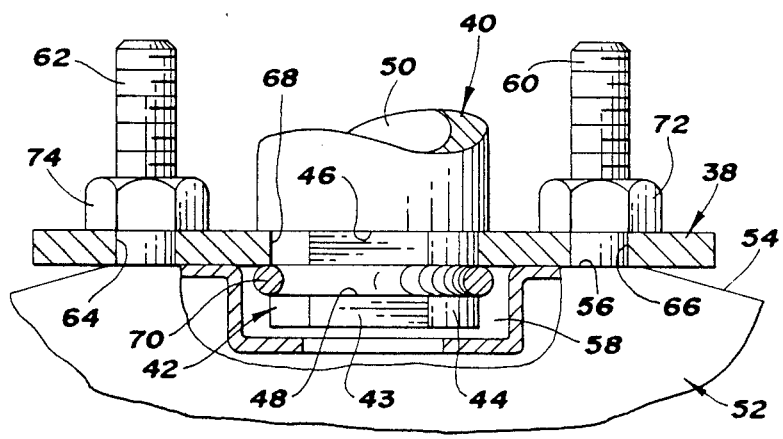
FIG. 3 is a fragmentary view in section of the interface of the master cylinder and the booster of FIG. 2.

FIG. 3 shows the master cylinder 40 and the servo booster 52 connected together. The bore 58 of the servo booster 52 receives the neck down segment 44 of the master cylinder 40. The flange 38 is held against the planar front surface 56 by the threaded nuts 72 and 74 in connection with the threaded studs 60 and 62. The lock ring 70 holds the flange 38 against the shoulder 46 of the master cylinder 40.

Figure 4:
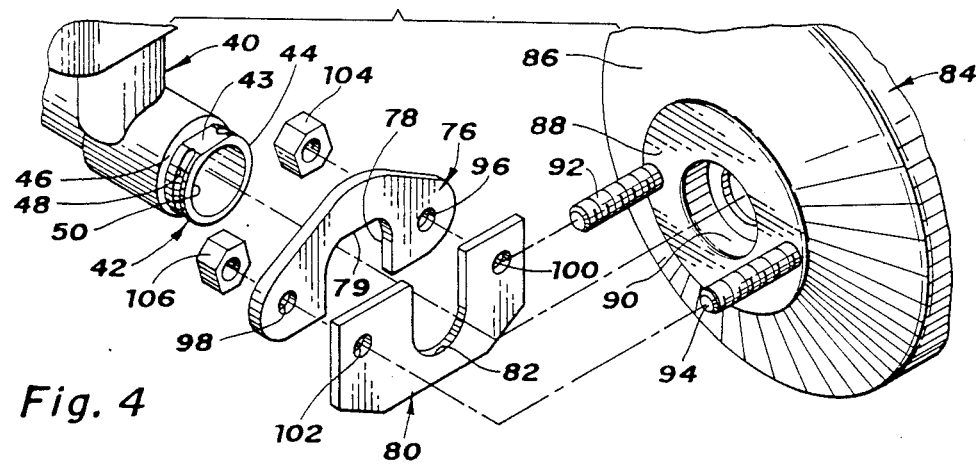
FIG. 4 is an exploded fragmentary view in perspective of another embodiment of the invention.

A second embodiment of the invention, shown in FIG. 4, has a master cylinder identical to the master cylinder of FIGS. 2 and 3 and has like parts designated by like reference numbers. A first adapter flange 76 has a slot 78 for straddling the necked down portion 44 of the master cylinder. A second adapter flange 80 has a slot 82 to be received in the groove 48 in the necked down segment 44 of the master cylinder 40.

A servo booster 84 has a front shell 86 with a planar front surface 88 and a bore 90. The bore 90 has a pushrod, not shown, projecting from it. The front shell 86 has two threaded studs 92 and 94 for connecting the servo booster 84 to the first flange 76 and the second flange 80. The first flange 76 has as two holes 96 and 98 that are aligned and spaced to register with the threaded studs 92 and 94. The second flange 80 also has two holes 100 and 102 that are aligned and spaced to register with the threaded studs 92 and 94.

The slot 82 of second flange 80 acts as a lock ring that slips into the groove 48 of the necked down segment 44 and holds the first flange 76 against the shoulder 46 of the master cylinder 40. The first flange 76 has a flat region 79 provided in the slot 78 to engage with the flat portion 43 of the "D" shaped necked down segment 44 to prevent rotation between the master cylinder 40 and the flanges 76 and 80.

Two threaded nuts 104 and 106 are installed on the threaded studs 92 and 94 to hold the second flange 80 against the planar front surface 88 of the servo booster.

Figure 5:
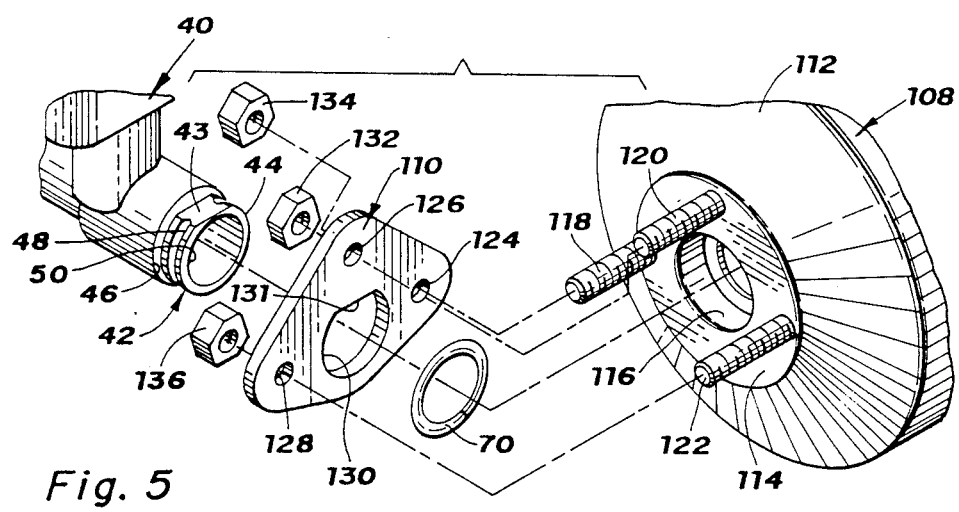
FIG. 5 is an exploded fragmentary view in perspective of another embodiment of the invention.

FIG. 5 shows that the standard master cylinder 40 may be attached to a different servo booster 108 by an adapter flange 110. The servo booster 108 has a front shell 112 with a planar front surface 114 and a bore 116. The bore has a pushrod, not shown, projecting from it. The front shell 112 has three threaded studs 118, 120 and 122 for connecting the servo booster 108 to the flange 110. The flange 110 has three holes 124, 126 and 128 that are aligned and spaced to register with the threaded studs 118, 120, and 122.

The flange 110 has an aperture 130 for fitting the necked down segment 44 of the master cylinder 40. A lock ring 70 is received in the groove 48 on the master cylinder 40. The lock ring 70 holds the flange 110 against the shoulder 46 of the master cylinder 40. The aperture 130 has a flat portion 131 which engages with the flat portion 43 to prevent rotation between the master cylinder 40 and the flange 110.

Three threaded nuts 132, 134 and 136 are installed on the threaded studs 118, 120, and 122 to hold the flange 110 against the planar front surface 114 of the servo booster 108. The servo booster bore 116 receives the end portion 42 and the lock ring 70 that extends beyond the flange 110.

Figure 6:
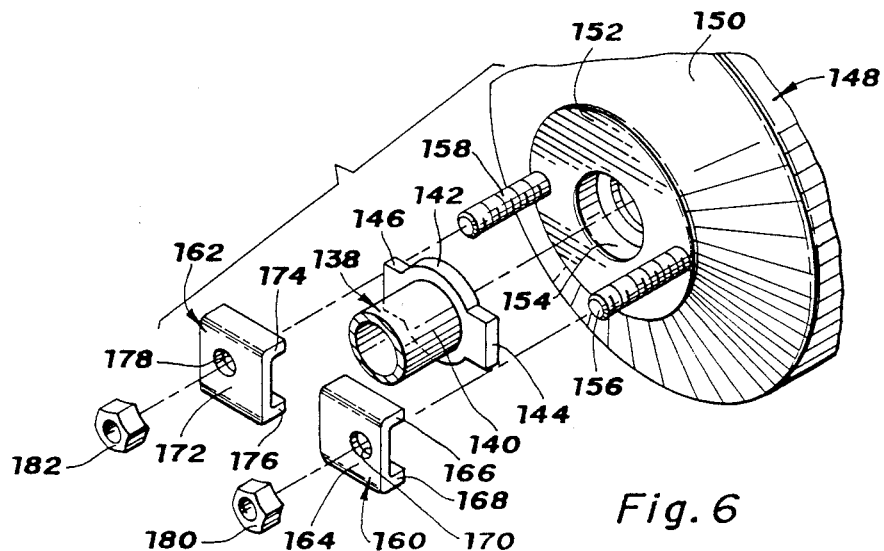
FIG. 6 is an exploded fragmentary view in perspective of another embodiment of the invention.

Another embodiment is shown in FIG. 6, where a master cylinder 138 has a connection end 140. The connection end 140 has a flange 142 with two tabs 144 and 146.

The servo booster 148 has a front shell 150 with a planar front surface 152 and a bore 154. The bore has a pushrod, not shown, projecting from it. The front shell 150 has two threaded studs 156 and 158 for connecting the servo booster 148 to the master cylinder 138. The tabs 144 and 146 on the flange 142 are sized so that the they fit between the threaded studs 156 and 158.

A pair of braces 160 and 162 hold the flange 142 of the master cylinder 138 to the planar front surface 152 of the servo booster 148. The brace 160 has a channel shape with a base 164 and a pair of legs 166 and 168. The legs 166 and 168 are spaced to straddle and overlay the tab 144. The length of the legs 166 and 168 does not exceed the thickness of the tab 144 so that the base 164 will engage the tab 144. The brace 160 has a hole 170 to receive the threaded stud 156. The second brace 162 is similarly shaped and has a base 172 and a pair of legs 174 and 176. The base 172 has a hole 178 to receive the threaded stud 158. A pair of threaded nuts 180 and 182 are installed on the threaded studs 156 and 158 so that braces 160 and 162 hold the flange 142 against the planar surface 152. The tabs 144 and 146 can be part of the casting of the master cylinder 138 or welded on to the master cylinder. The legs of the braces 160 and 162 prevent the rotation between the tabs 144 and 146 of the master cylinder 138 and the servo booster 148.

Figure 7:
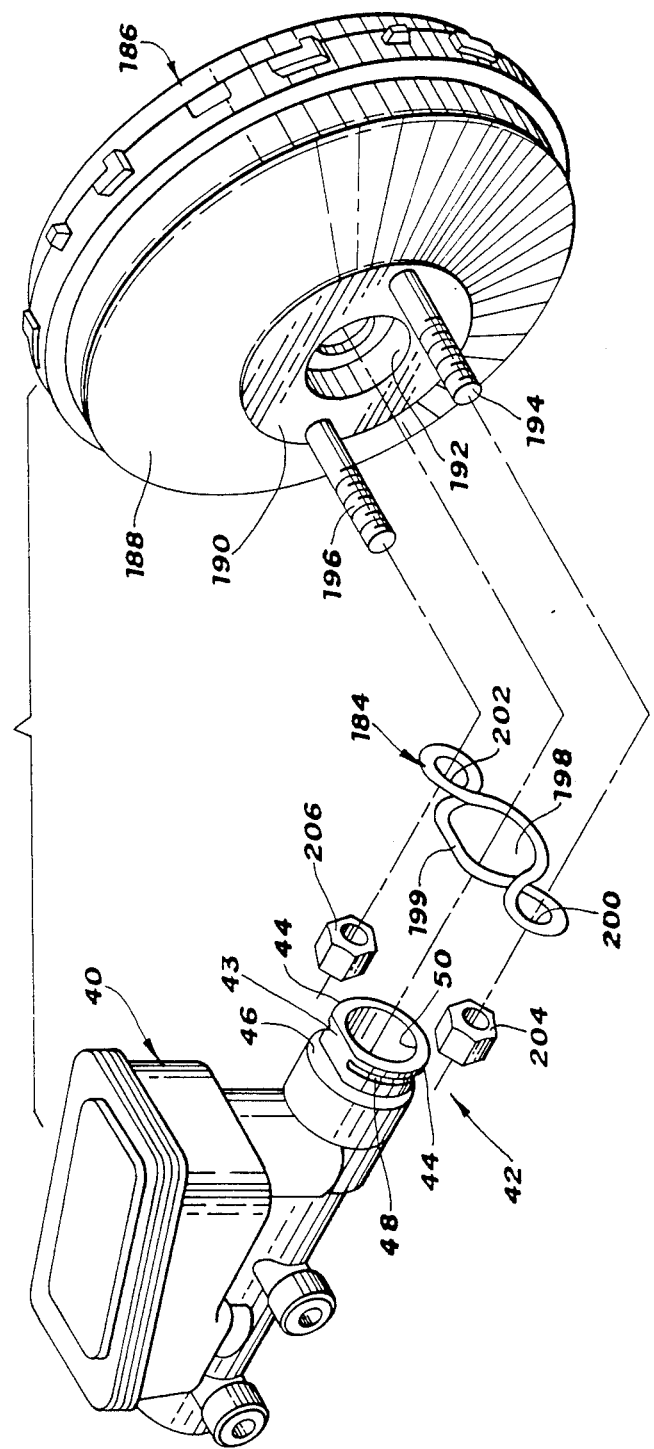
FIG. 7 is an exploded fragmentary view in perspective of another embodiment of the invention.

Another embodiment of the invention shown in FIG. 7 has a master cylinder identical to the master cylinder 40 of FIG. 2 and 3 and has like parts designated by like reference numbers. A wire form 184 connects the master cylinder 40 to a servo booster 186. The wire form is constructed of spring wire bent substantially in one plane to define an enclosed central portion 198 and two enclosed offset portions 200 and 202 that border the central portion 198. The central portion 198 of the wire form 184 defines a lock ring portion which is received in the groove 48 of the master cylinder to attach the wire form to the master cylinder 40. The central portion 198 has a straight segment 199 which fits the flat portion 43 of the "D" shaped necked down segment 44 to prevent rotation between the master cylinder 40 and the wire form 184.

The servo booster 186 has a front shell 188 with a planar front surface 190 and a bore 192. The bore 192 has a pushrod, not shown, projecting from it. The front shell 188 has a plurality of threaded studs 194 and 196 for connecting the servo booster 186 to the wire form 184. The two offset portions 200 and 202 are aligned and spaced to register with the threaded studs 194 and 196.

Two threaded nuts 204 and 206 are installed on the threaded studs 194 and 196 to hold the wire form 184 against the planar front surface 190 of the servo booster 186.

The use of the adapter comprised of a flange or a wire form allows the use of a standard master cylinder with a variety of different servo boosters with two or more threaded studs. The threaded studs can be various sizes and located in various places on the servo booster. All that is required is to use the appropriate size flange or wire form so that the holes in the flange or wire form will register with the studs. This will eliminate the need to inventory various master cylinders or machine various fittings.

The use of the braces of FIG. 6 will allow a standardized master cylinder having the same number and spacing of tabs as threaded studs on the servo booster to be used even when the offset distance and diameter of the threaded stud varies from servo booster to servo booster. It is realized with this embodiment that different master cylinder will be required if the servo booster has a different number of threaded studs.

Thus it is seen that the objective of eliminating the requirement to keep in inventory various styles of master cylinder has been achieved.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. Apparatus for connecting a master cylinder to a brake booster of the type having a shell with a planar front surface having a pushrod projecting from a bore therein and a plurality of threaded studs displayed about the bore and projecting from the planar front surface, comprising:
   a master cylinder having an end portion facing the booster;
   retaining means carried by the end portion of the master cylinder;
   adapter means adapted to engage with the retaining means carried by the end portion of the master cylinder and having a plurality of apertures which register with the plurality of threaded studs;
   and a plurality of threaded nuts installed on the threaded studs to retain the adapter means in engagement with the planar surface of the booster shell.

2. Apparatus for connecting a master cylinder to a brake booster of the type having a shell with a planar front surface having a pushrod projecting from a bore therein and a plurality of threaded studs displayed about the bore and projecting from the planar front surface, comprising:
   a master cylinder having a necked down end portion defining a shoulder facing the booster;
   a circumferential extending groove provided in the necked down end portion and spaced longitudinally from the shoulder;
   adapter means having a central aperture to receive the necked down end portion of the master cylinder and having a plurality of apertures which register with the plurality of threaded studs;
   a lock means received in the groove of the master cylinder and effective to lock the adapter means to the master cylinder and in engagement with the shoulder;
   and a plurality of threaded nuts installed on the threaded studs to retain the adapter means in engagement with the planar surface of the booster shell.

3. The apparatus of claim 2 further characterized by the necked down end portion of the master cylinder having a flat surface thereon and the aperture of the adapter means having a flat surface mating therewith so that the master cylinder is retained against rotation relative to the adapter means and the booster.

4. Apparatus for connecting a master cylinder to a brake booster of the type having a shell with a planar front surface having a pushrod projecting from a bore therein and a plurality of threaded studs displayed about the bore and projecting from the planar front surface, comprising:
   a master cylinder having a necked down end portion defining a shoulder facing the booster;
   a circumferential extending groove provided in the necked down end portion and spaced longitudinally from the shoulder;
   a flange having an aperture for fitting the necked down portion of the master cylinder and a plurality of holes aligned and spaced to register with the plurality of threaded studs;
   a lock ring to be received in the groove on the necked down portion of the master cylinder, and effective to lock the flange to the master cylinder and in engagement with the shoulder; and
   a plurality of threaded nuts installed on the threaded studs to retain the flange in engagement with the planar surface of the booster shell.

5. Apparatus for connecting a master cylinder to a brake booster of the type having a shell with a planar front surface having a pushrod projecting from a bore therein and a plurality of threaded studs displayed about the bore and projecting from the planar front surface, comprising:
   a master cylinder having a necked down end portion defining a shoulder facing the booster;
   a circumferential extending groove provided in the necked down end portion and spaced longitudinally from the shoulder;
   a first flange having a slot for fitting the neck down portion of the master cylinder and a plurality of holes aligned and spaced to register with the plurality of threaded studs;
   a second flange having a slot to be received in the groove of the necked down end portion of the master cylinder and effective to lock the first flange to the master cylinder in engagement with the shoulder and the second flange also having a plurality of holes aligned and spaced to register with the plurality of holes on the first flange and the plurality of threaded studs; and
   a plurality of threaded nuts installed on the threaded studs to retain the second flange in engagement with the planar surface of the booster shell.

6. Apparatus for connecting a master cylinder to a brake booster of the type having a shell with a planar front surface having a pushrod projecting from a bore therein and a plurality of threaded studs displayed about the bore and projecting from the planar front surface, comprising:
   a master cylinder having a necked down end portion defining a shoulder facing the booster;
   a circumferential extending groove provided in the necked down end portion and spaced longitudinally from the shoulder;
   a wire form having a central portion defining a locking ring to receive the necked down portion of the master cylinder and seat within the groove to secure the master cylinder to the wire form and a plurality of offset portions formed internal with the central portion and defining holes aligned and spaced to register with the plurality of threaded studs; and
   a plurality of threaded nuts installed on the threaded studs to retain the wire form in engagement with the planar surface of the booster shell.

7. Apparatus for connecting a master cylinder to a brake booster of the type having a shell with a planar front surface having a pushrod projecting from a bore therein and a plurality of threaded studs displayed about the bore and projecting from the planar front surface, comprising:

a master cylinder having a connection end with a flange and a plurality of tabs;

a plurality of braces, each brace adapted to fit in overlying engagement with one of the tabs and having a hole for receiving one of the threaded studs; and a plurality of threaded nuts installed on the threaded studs to retain the brace and tab in engagement with the planar surface of the booster shell.

* * * * *